(12) United States Patent
Masai et al.

(10) Patent No.: US 11,441,661 B2
(45) Date of Patent: Sep. 13, 2022

(54) GEAR DEVICE AND ROBOT

(71) Applicant: Seiko Epson Corporation, Toyko (JP)

(72) Inventors: Satoru Masai, Ina (JP); Yuya Kataoka, Azumino (JP); Nobuyuki Takehana, Matsumoto (JP); Yoshiyuki Soya, Matsumoto (JP)

(73) Assignee: Seiko Epson Corporation

( * ) Notice: Subject to any disclaimer, the term of this patent is extended or adjusted under 35 U.S.C. 154(b) by 20 days.

(21) Appl. No.: 17/186,020

(22) Filed: Feb. 26, 2021

(65) Prior Publication Data

US 2021/0270355 A1 Sep. 2, 2021

(30) Foreign Application Priority Data

Feb. 28, 2020 (JP) .............................. JP2020-033255

(51) Int. Cl.
*F16H 49/00* (2006.01)
*B25J 9/10* (2006.01)

(52) U.S. Cl.
CPC .......... *F16H 49/001* (2013.01); *B25J 9/1025* (2013.01)

(58) Field of Classification Search
CPC .............................. F16H 49/001; B25J 9/1025
USPC ........................................................ 74/640
See application file for complete search history.

(56) References Cited

U.S. PATENT DOCUMENTS

| | | | | |
|---|---|---|---|---|
| 10,151,377 | B2* | 12/2018 | Hofmann | F16H 49/001 |
| 10,941,847 | B2* | 3/2021 | Hofmann | C22C 45/10 |
| 11,185,921 | B2* | 11/2021 | Hofmann | B33Y 80/00 |
| 11,198,181 | B2* | 12/2021 | Hofmann | B22F 5/08 |
| 2004/0103536 | A1 | 6/2004 | Kobayashi et al. | |
| 2011/0154928 | A1* | 6/2011 | Ishikawa | F16H 55/0833 74/461 |
| 2015/0323053 | A1* | 11/2015 | El-Wardany | B22F 7/06 419/38 |
| 2016/0258522 | A1* | 9/2016 | Hofmann | B22D 19/0036 |

FOREIGN PATENT DOCUMENTS

JP 2002-307237 A 10/2002

* cited by examiner

*Primary Examiner* — Ha Dinh Ho
(74) *Attorney, Agent, or Firm* — Harness, Dickey & Pierce, P.L.C.

(57) ABSTRACT

A gear device includes an internal gear, an external gear having flexibility configured to partially mesh with the internal gear and rotate, and a wave generator provided on an inner side of the external gear and configured to move a meshing position of the internal gear and the external gear in a circumferential direction around the rotation axis. A main material of the internal gear includes graphite particles. A tooth surface of an internal tooth of the internal gear has a convex pattern including a first convex part and a second convex part extending in a first direction having a component along the rotation axis and arranged side by side in a second direction crossing the first direction, and $10 \leq D \leq 40$ and $S-D \leq 20$, wherein D [μm] is an average particle diameter of the graphite particles and S [μm] is a separation distance between the first convex part and the second convex part in the second direction.

5 Claims, 10 Drawing Sheets

RELATION BETWEEN "S-D" OF INTERNAL GEAR AND LIFE

SEPARATION DISTANCE S BETWEEN CONVEX PARTS - AVERAGE DIAMETER D (μm) OF GRAPHITE PARTICLES

FIG. 10

| S − D [μm] | EVALUATION | REASONS FOR EVALUATIONS DESCRIBED ON LEFT |
|---|---|---|
| −20 | A | The number of convex parts with respect to graphite particles is sufficiently large and a probability that the graphite particles appear at the tops of the convex parts is sufficiently high. Therefore, a sufficient amount of graphite is shaved and lubricant sufficiently accumulates in concave parts. Consequently, the life is particularly long. |
| −12 | A | |
| −11 | A | |
| −10 | A | |
| −9 | B | The number of convex parts with respect to graphite particles is large and a probability that the graphite particles appear at the tops of the convex parts is high. Therefore, a lot of graphite is shaved and lubricant easily accumulates in concave parts. Consequently, the life is long. |
| −8 | B | |
| 0 | B | |
| 8 | B | |
| 9 | B | |
| 10 | B | |
| 11 | C | A necessary amount of graphite is shaved. The life is endurable for use of the gear device. |
| 12 | C | |
| 18 | C | |
| 19 | C | |
| 20 | C | |
| 21 | D | The number of convex parts with respect to graphite particles is small and a probability that the graphite particles appear at the tops of the convex parts is low. Therefore, an amount of shaved graphite is small. The life of the gear device is short. |
| 22 | D | |
| 30 | D | |
| 40 | D | |
| 50 | D | |

GEAR DEVICE AND ROBOT

The present application is based on, and claims priority from JP Application Serial Number 2020-033255, filed Feb. 28, 2020, the disclosure of which is hereby incorporated by reference herein in its entirety.

BACKGROUND

1. Technical Field

The present disclosure relates to a gear device and a robot.

2. Related Art

In a robot including a robot arm including at least one arm, for example, a joint section of the robot arm is turned by motor driving. Rotation of a motor is decelerated by a speed reducer and transmitted to the robot arm.

As such a speed reducer, for example, a wave gear device described in JP-A-2002-307237 (Patent Literature 1) is known. The wave gear device described in Patent Literature 1 is configured by a rigid internal gear formed in an annular shape, a cup-like flexible external gear disposed on the inner side of the internal gear, and a wave generator having an elliptical contour fit on the inner side of the external gear. Spherical graphite cast iron is used as a material forming the internal gear. The spherical graphite cast iron includes graphite particles and can impart satisfactory lubricity by the graphite particles to a meshing position of the internal gear and the external gear. Consequently, extension of the life of the wave gear device can be achieved.

However, even if the internal gear includes the graphite particles, if the graphite particles exposed to a position where internal teeth and external teeth rub with each other are few, sufficient lubricity cannot be imparted to the meshing position of the internal gear and the external gear. In this case, extension of the life of the wave gear device cannot be achieved.

SUMMARY

A gear device according to an application example of the present disclosure includes: an internal gear; an external gear having flexibility configured to partially mesh with the internal gear and relatively rotate around a rotation axis with respect to the internal gear; and a wave generator provided on an inner side of the external gear and configured to move a meshing position of the internal gear and the external gear in a circumferential direction around the rotation axis. A main material of the internal gear includes graphite particles. A tooth surface of an internal tooth of the internal gear has a convex pattern including a first convex part and a second convex part extending in a first direction having a component along the rotation axis and arranged side by side in a second direction crossing the first direction, and $10 \leq D \leq 40$ and $S-D \leq 20$, wherein D [μm] is an average particle diameter of the graphite particles and S [μm] is a separation distance between the first convex part and the second convex part in the second direction.

BRIEF DESCRIPTION OF THE DRAWINGS

FIG. 10 is a table showing evaluation for the graph of FIG. 9.

DESCRIPTION OF EXEMPLARY EMBODIMENTS

A gear device and a robot according to the present disclosure are explained in detail below based on preferred embodiments shown in the accompanying drawings.

1. Robot

First, the robot is briefly explained.

Figure 1:
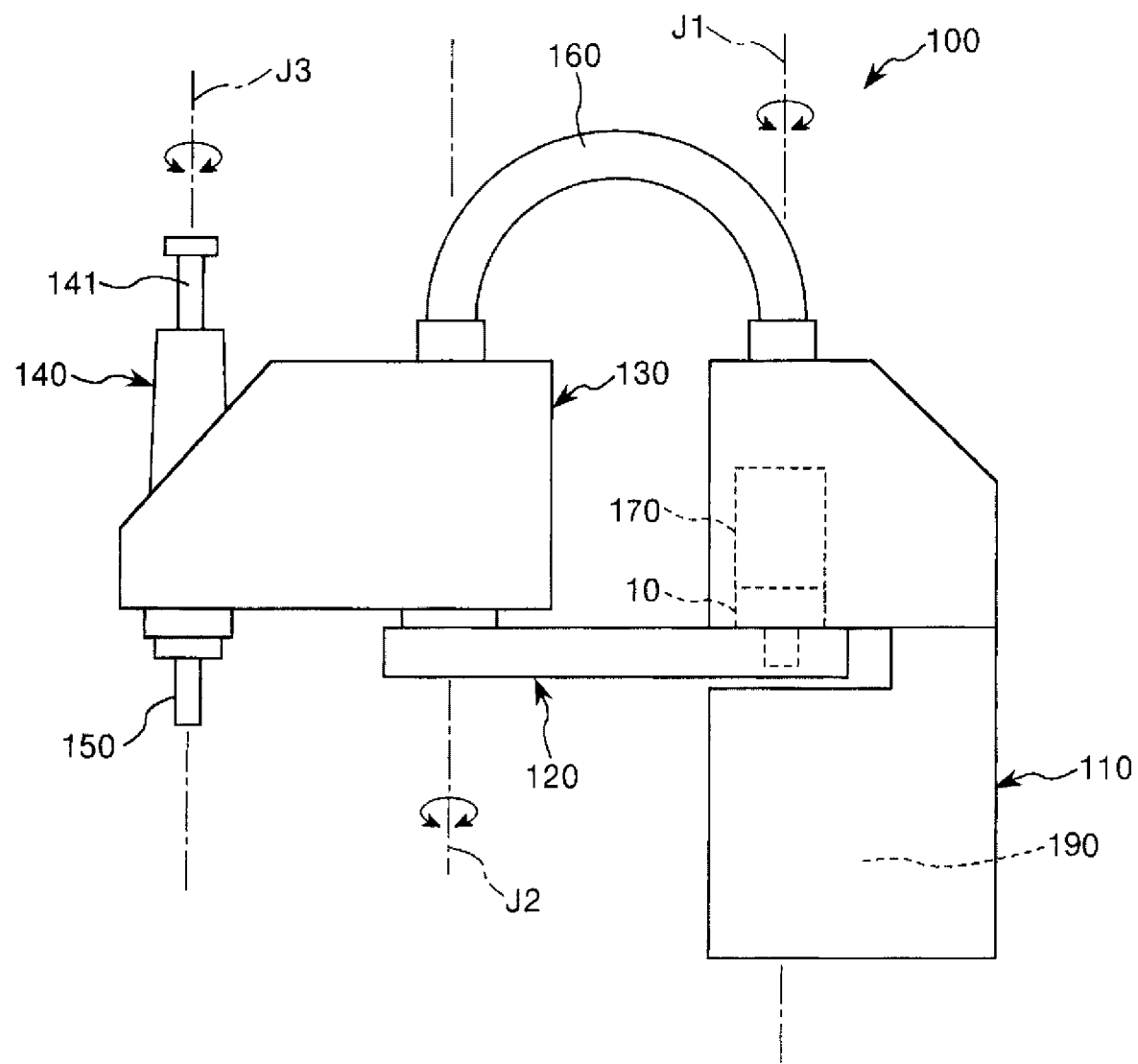
FIG. 1 is a side view showing a schematic configuration of a robot according to a first embodiment.

FIG. 1 is a side view showing a schematic configuration of a robot according to an embodiment. In the following explanation, for convenience of explanation, the upper side in FIG. 1 is referred to as "upper" and the lower side in FIG. 1 is referred to as "lower". A base side in FIG. 1 is referred to as "proximal end side" and the opposite side of the base side, that is, an end effector side is referred to as "distal end side". A "direction" in this specification includes both of a direction on one side along an axis and the opposite direction of the direction on the one side.

A robot 100 shown in FIG. 1 is, for example, a robot used for work such as supply, removal, conveyance, and assembly of a precision instrument and components configuring the precision instrument. The robot 100 includes, as shown in FIG. 1, a base 110, a first arm 120, a second arm 130, a work head 140, an end effector 150, and a pipe 160. The sections of the robot 100 are briefly explained below in order.

The base 110 is fixed to, for example, a not-shown floor surface by bolts or the like. A control device 190 that integrally controls the robot 100 is set on the inside of the base 110. The first arm 120 is coupled to the base 110 to be capable of turning around a first axis J1, which is along the vertical direction, with respect to the base 110. That is, the first arm 120 relatively turns with respect to the base 110.

In the base 110, a motor 170 (a driving source), which is a first motor such as a servomotor that generates driving force for turning the first arm 120, and a gear device 10, which is a first speed reducer that decelerates rotation by the driving force of the motor 170, are set. An input shaft of the gear device 10 is coupled to a rotating shaft of the motor 170. An output shaft of the gear device 10 is coupled to the first arm 120. Therefore, when the motor 170 is driven and the driving force of the motor 170 is transmitted to the first arm 120 via the gear device 10, the first arm 120 relatively turns in a horizontal plane around the first axis J1 with respect to the base 110. That is, the motor 170 is a driving source that outputs the driving force toward the gear device 10.

The second arm 130 capable of turning around a second axis J2 with respect to the first arm 120 is coupled to the distal end portion of the first arm 120. In the second arm 130, although not shown in FIG. 1, a second motor that generates driving force for turning the second arm 130 and a second speed reducer that decelerates rotation by the driving force of the second motor are set. The driving force of the second motor is transmitted to the second arm 130 via the second speed reducer, whereby the second arm 130 turns in a horizontal plane around the second axis J2 with respect to the first arm 120.

The work head 140 is disposed at the distal end portion of the second arm 130. The work head 140 includes a spline shaft 141 inserted through a not-shown spline nut and a not-shown ball screw nut coaxially disposed at the distal end portion of the second arm 130. The spline shaft 141 is capable of rotating around a third axis J3 shown in FIG. 1 with respect to the second arm 130 and is capable of moving in the up-down direction.

In the second arm 130, although not shown in FIG. 1, a rotary motor and a lifting and lowering motor are disposed. Driving force of the rotary motor is transmitted to the spline nut by a not-shown driving force transmitting mechanism. When the spline nut regularly and reversely rotates, the spline shaft 141 regularly and reversely rotates around the third axis J3, which is along the vertical direction.

On the other hand, driving force of the lifting and lowering motor is transmitted to the ball screw nut by a not-shown driving force transmitting mechanism. When the ball screw nut regularly and reversely rotates, the spline shaft 141 moves up and down.

The end effector 150 is coupled to the distal end portion of the spline shaft 141. The end effector 150 is not particularly limited. Examples of the end effector 150 include an end effector that grips a conveyed object and an end effector that machines a workpiece.

A plurality of wires coupled to electronic components, for example, the second motor, the rotary motor, and the lifting and lowering motor disposed in the second arm 130 are drawn around to the inside of the base 110 through a tubular pipe 160 that couples the second arm 130 and the base 110. Further, such a plurality of wires are collected in the base 110 to thereby be drawn around to the control device 190 set in the base 110 together with wires coupled to the motor 170 and a not-shown encoder.

As explained above, the robot 100 includes the base 110, which is a first member, the first arm 120, which is a second member, provided to be capable of turning with respect to the base 110, the gear device 10 that transmits driving force from one side to the other side of the base 110 and the first arm 120, and the motor 170, which is the driving source that outputs driving force toward the gear device 10.

The first arm 120 and the second arm 130 may be collectively grasped as the "second member". The "second member" may further include the work head 140 and the end effector 150 in addition to the first arm 120 and the second arm 130.

In this embodiment, the first speed reducer is configured by the gear device 10. However, the second speed reducer may be configured by the gear device 10 or both of the first speed reducer and the second speed reducer may be configured by the gear device 10. When the second speed reducer is configured by the gear device 10, the first arm 120 should be grasped as the "first member" and the second arm 130 should be grasped as the "second member".

In this embodiment, the motor 170 and the gear device 10 are provided in the base 110. However, the motor 170 and the gear device 10 may be provided in the first arm 120. In this case, the output shaft of the gear device 10 should be coupled to the base 110.

2. Gear Device According to the First Embodiment

The gear device according to the first embodiment is explained.

Figure 2:
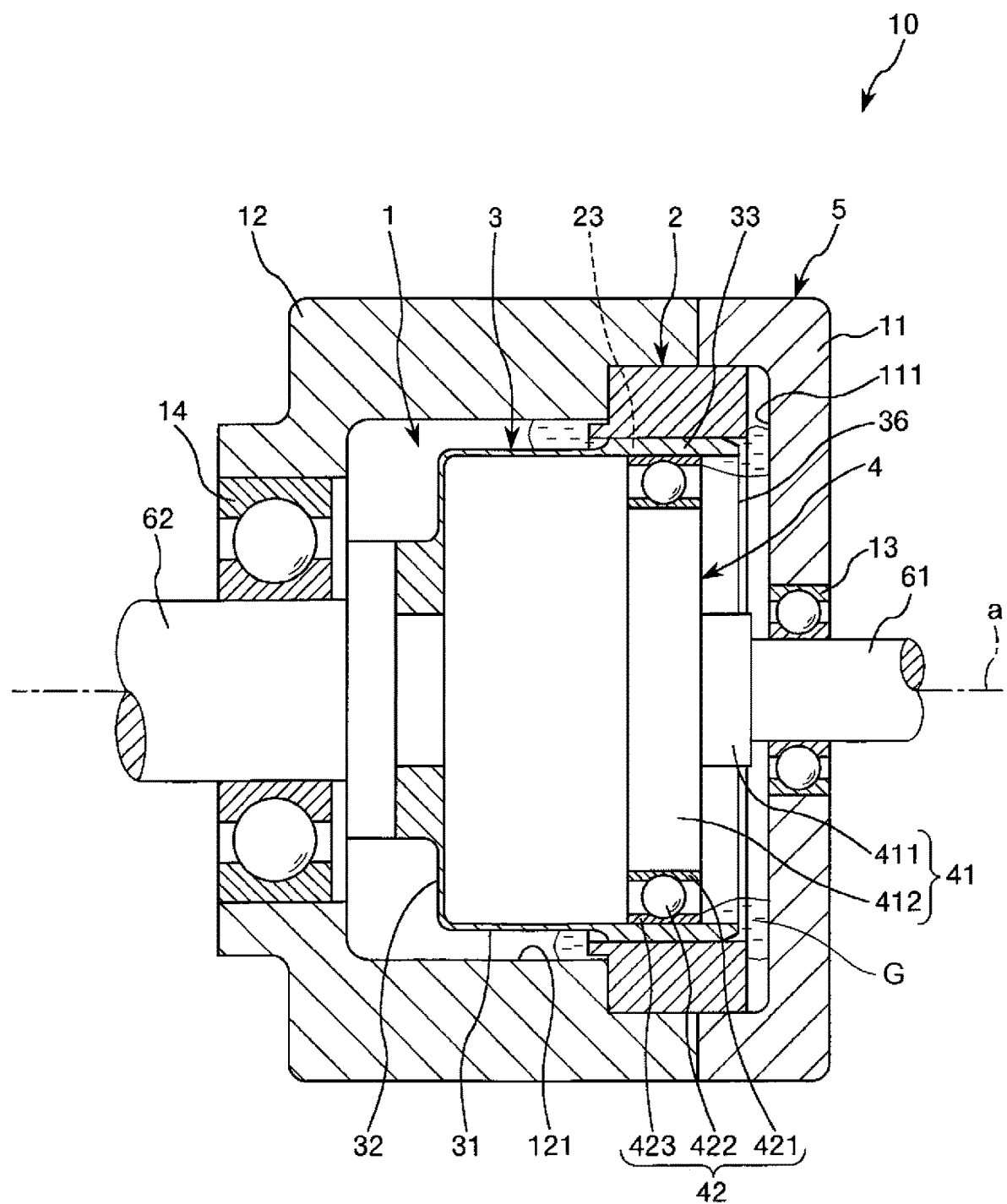
FIG. 2 is a longitudinal sectional view showing a gear device according to the first embodiment.
Figure 3:
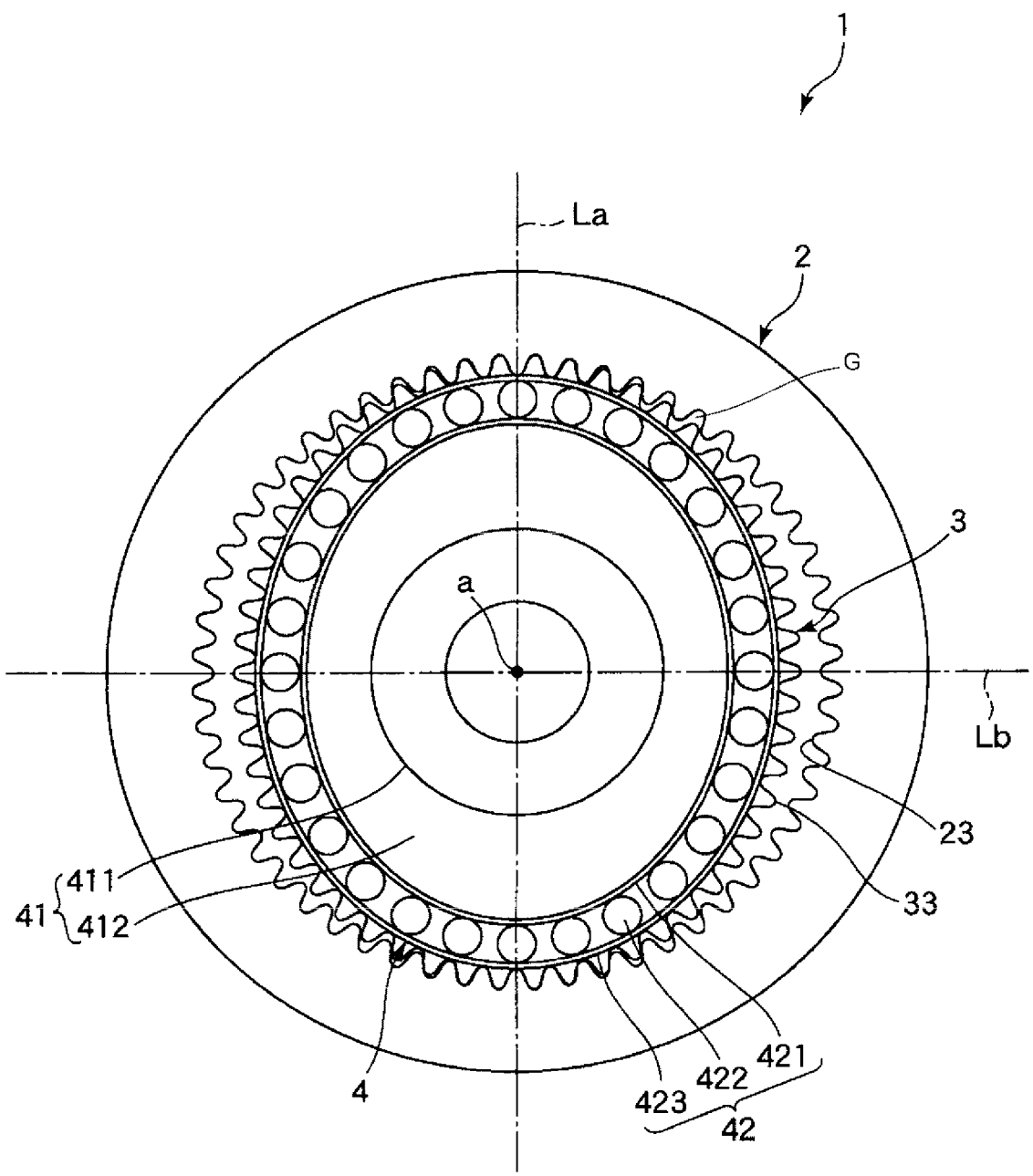
FIG. 3 is a front view of a gear device main body shown in FIG. 2 and a view of the gear device main body viewed from an axis "a" direction.
Figure 4:
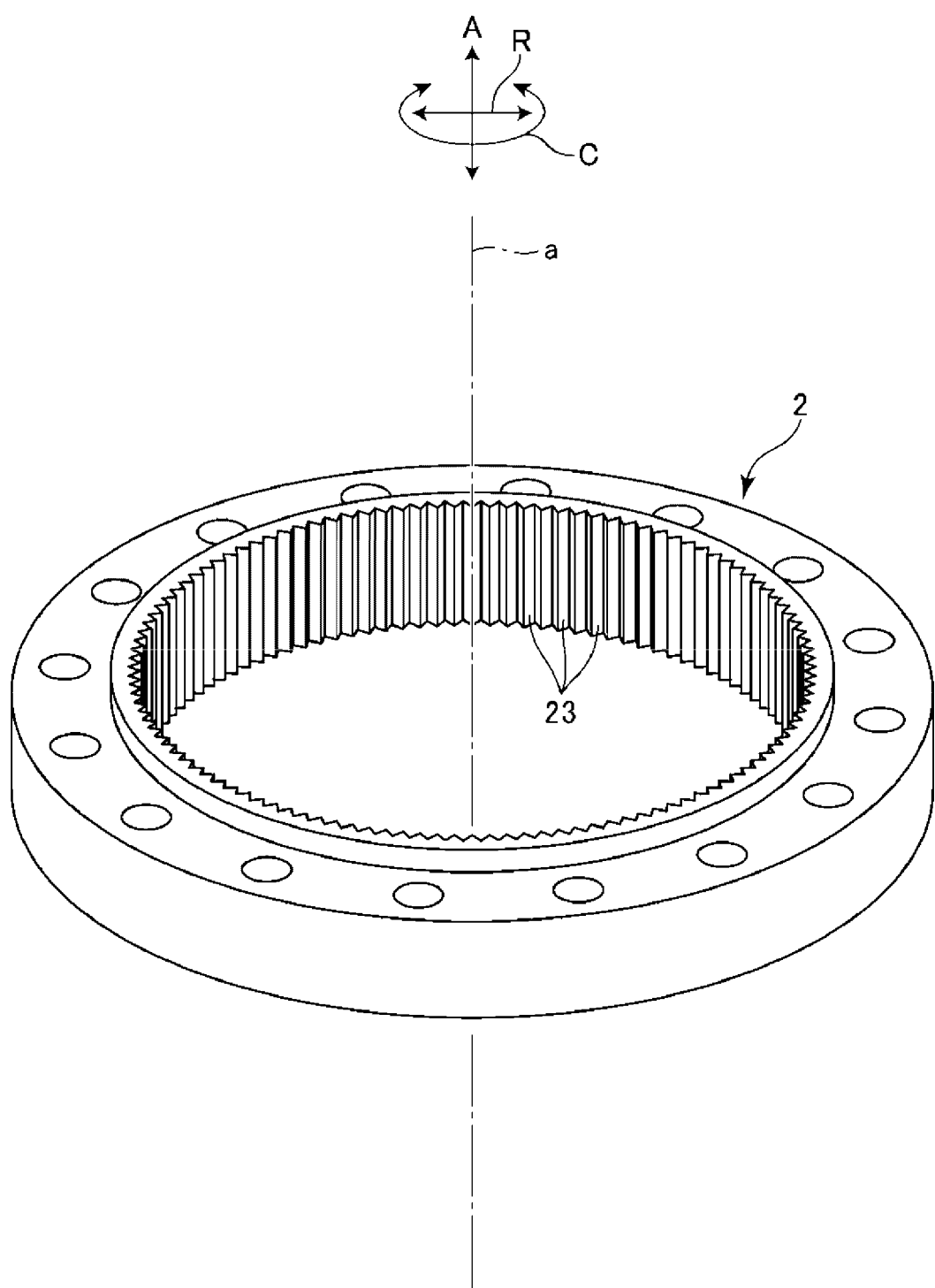
FIG. 4 is a perspective view showing a single unit of a rigid gear shown in FIG. 3.
Figure 5:
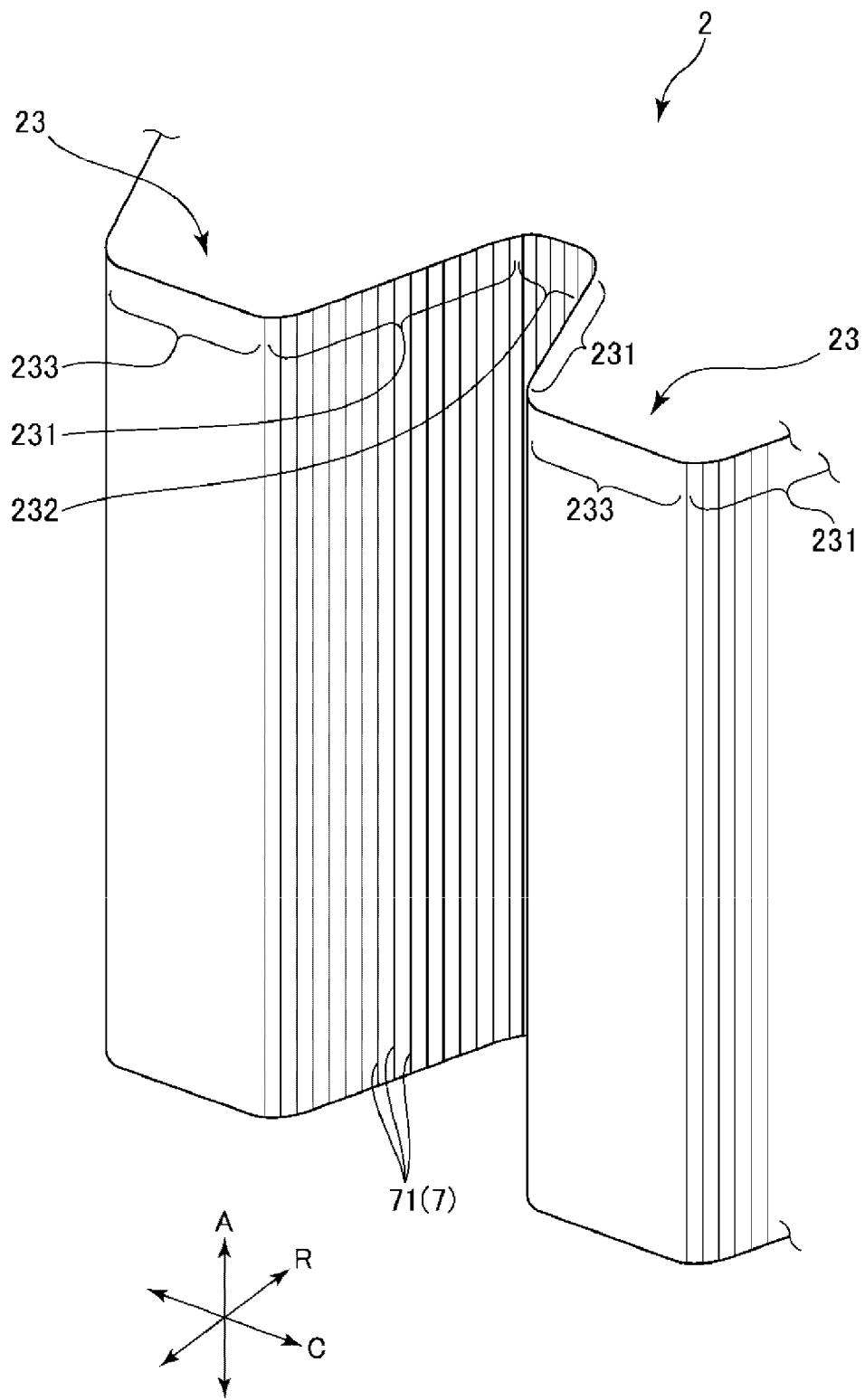
FIG. 5 is a partially enlarged view of FIG. 4.
Figure 6:
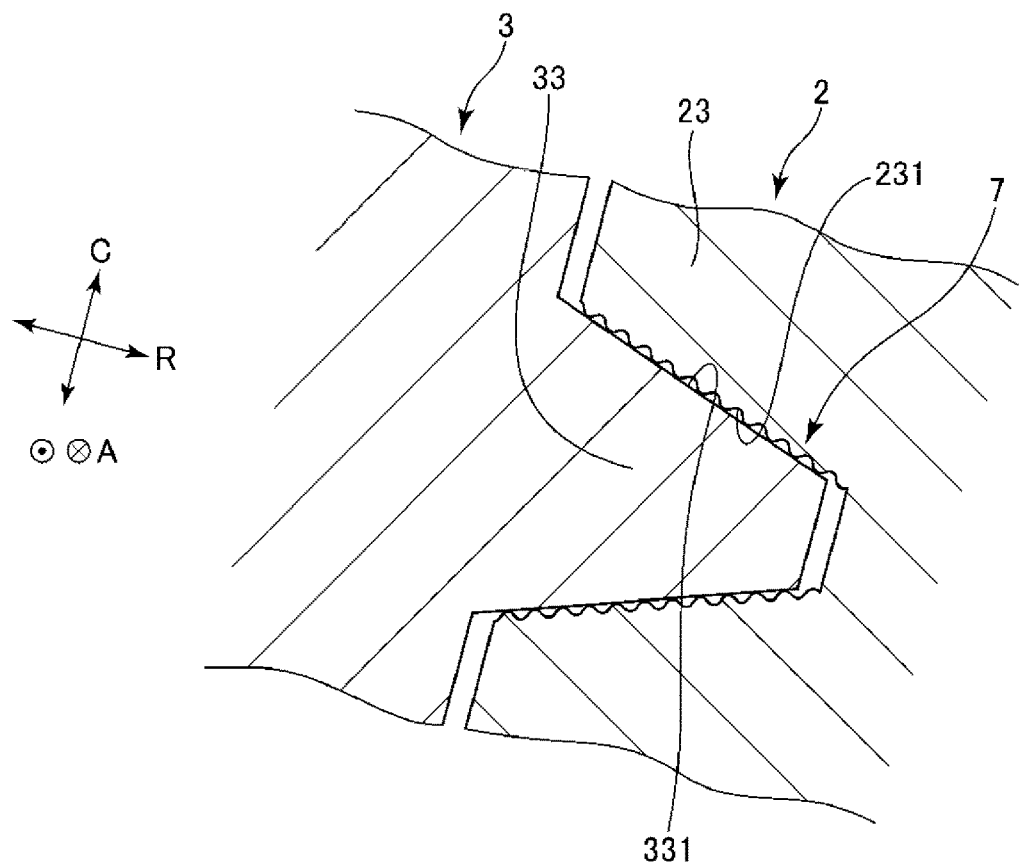
FIG. 6 is a sectional view partially enlarging and showing a meshing position of internal teeth of the rigid gear shown in FIG. 3 and external teeth of a flexible gear.
Figure 7:
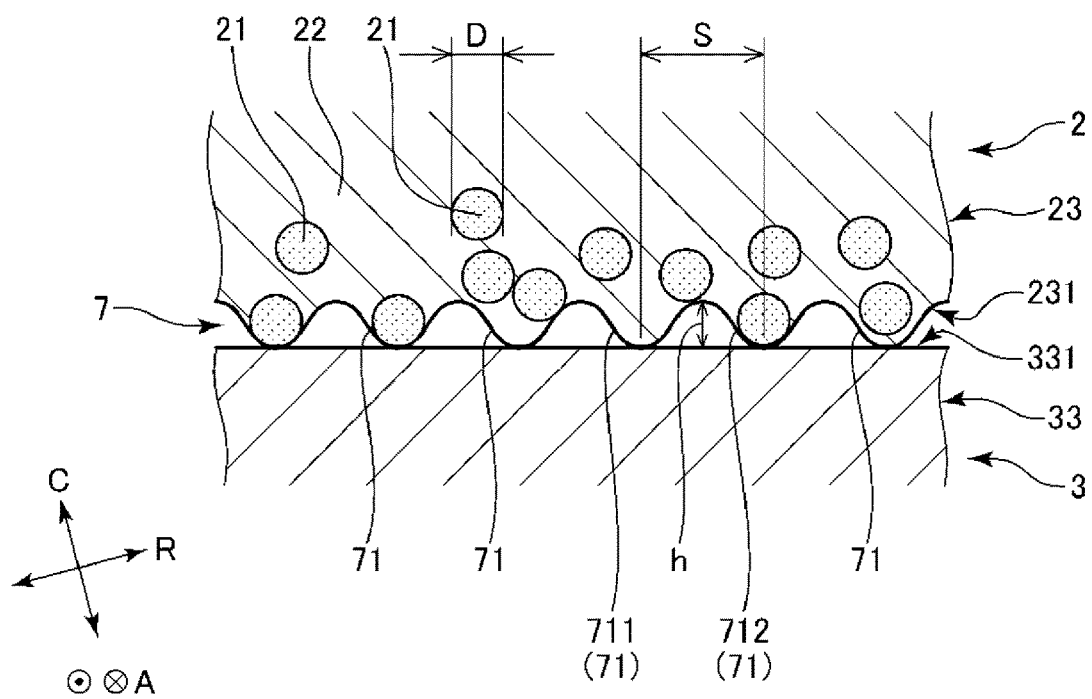
FIG. 7 is a partially enlarged view of FIG. 6.

FIG. 2 is a longitudinal sectional view showing the gear device according to the first embodiment. FIG. 3 is a front view of a gear device main body shown in FIG. 2 and is a view of the gear device main body viewed from an axis "a" direction. FIG. 4 is a perspective view showing a single unit of a rigid gear shown in FIG. 3. FIG. 5 is a partially enlarged view of FIG. 4. FIG. 6 is a sectional view partially enlarging and showing a meshing position of internal teeth of the rigid gear shown in FIG. 3 and external teeth of a flexible gear. FIG. 7 is a partially enlarged view of FIG. 6. In the figures, for convenience of explanation, dimensions of sections are exaggerated and shown as appropriate according to necessity and dimension ratios among the sections do not always coincide with actual dimension ratios.

The gear device 10 shown in FIG. 2 is a wave gear device and is used as, for example, a speed reducer. The gear device 10 includes a gear device main body 1 and a case 5 in which the gear device main body 1 is housed. The gear device main body 1 and the case 5 are integrated. Lubricant G is disposed in the case 5 of the gear device 10. The sections of the gear device 10 are explained below. The case 5 should be provided according to necessity or may be omitted.

2.1. Gear Device Main Body

The gear device main body 1 includes a rigid gear 2, which is an internal gear, a flexible gear 3, which is a cup-type external gear, disposed on the inner side of the rigid gear 2, and a wave generator 4 disposed on the inner side of the flexible gear 3.

In this embodiment, the rigid gear 2 is coupled to the base 110 (the first member) of the robot 100 explained above via the case 5. The flexible gear 3 is coupled to the first arm 120 (the second member) of the robot 100 explained above. The wave generator 4 is coupled to the rotating shaft of the motor 170 disposed in the base 110 of the robot 100 explained above.

When the rotating shaft of the motor 170 rotates, the wave generator 4 rotates at the same rotating speed as rotating speed of the rotating shaft of the motor 170. Since the rigid gear 2 and the flexible gear 3 have different numbers of teeth, the rigid gear 2 and the flexible gear 3 relatively rotate around the axis "a" while a meshing position thereof moving in the circumferential direction. In this embodiment, since the number of teeth of the rigid gear 2 is larger than the number of teeth of the flexible gear 3, the flexible gear 3 can be rotated at rotating speed lower than the rotating speed of the rotating shaft of the motor 170. That is, it is possible to realize a speed reducer in which the wave generator 4 is on an input shaft side and the flexible gear 3 is on an output shaft side.

Depending on a form of the case 5, irrespective of whether the flexible gear 3 is coupled to the base 110 or the rigid gear 2 is coupled to the first arm 120, the gear device 10 can be used as the speed reducer. Also, even when the rotation axis of the motor 170 is coupled to the flexible gear 3, the gear device 10 can be used as a speed reducer. In this case, the wave generator 4 should be coupled to the base 110 and the rigid gear 2 should be coupled to the first arm 120.

When the gear device 10 is used as a speed increaser, that is, when the flexible gear 3 is rotated at rotating speed higher than the rotating speed of the rotating shaft of the motor 170, the relation between the input side and the output side explained above should be reversed.

As shown in FIGS. 2 and 3, the rigid gear 2 is a gear configured by a rigid body that does not substantially bend in the radial direction and is a ring-like internal gear including internal teeth 23. In this embodiment, the rigid gear 2 is a spur gear. That is, the internal teeth 23 have tooth traces parallel to the axis "a". The tooth traces of the internal teeth 23 may incline with respect to the axis "a". That is, the rigid gear 2 may be a helical gear or a double-helical gear.

As shown in FIGS. 2 and 3, the flexible gear 3 is inserted through the inner side of the rigid gear 2. The flexible gear 3 is a gear having flexibility deflectively deformable in the radial direction and is an external gear including external teeth 33 that mesh with a part of the internal gear 23 of the rigid gear 2. The number of teeth of the flexible gear 3 is smaller than the number of teeth of the rigid gear 2. Since the number of teeth of the flexible gear 3 and the number of teeth of the rigid gear are different in this way, a speed reducer can be realized.

In this embodiment, the flexible gear 3 is formed in a cup shape including an opening section 36 opened at one end in the axis "a" direction, that is, an end portion on the right side in FIG. 2. The external teeth 33 are formed from the opening section 36 toward the other end. The flexible gear 3 includes a tubular body section 31 around the axis "a" and a bottom section 32 coupled to the other end portion in the axis "a" direction of the body section 31. Consequently, the opening section 36, in which the external teeth 33 are provided, easily bends in the radial direction compared with the bottom section 32. Therefore, it is possible to realize satisfactory deflective meshing of the flexible gear 3 with the rigid gear 2. Further, for example, it is possible to increase the rigidity of the bottom section 32 to which, for example, a shaft 62 functioning as an output shaft is coupled. Consequently, the gear device 10 is suitable for a use in which backlash is extremely small and reversal is repeated. Since a ratio of simultaneously meshing number of teeth is large and force applied to one tooth is small, a high torque capacity can also be obtained.

As shown in FIGS. 2 and 3, the wave generator 4 is disposed on the inner side of the flexible gear 3 and is capable of rotating around the axis "a". The wave generator 4 deforms a cross section of the opening section 36 of the flexible gear 3 into an elliptical shape or an oval shape having a major axis La and a minor axis Lb to thereby mesh the external teeth 33 of the flexible gear 3 with the internal teeth 23 of the rigid gear 2. The flexible gear 3 and the rigid gear 2 are meshed with each other on the inside and the outside to be capable of rotating around the same axis "a".

In this embodiment, the wave generator 4 includes a cam 41 and a bearing 42 attached to the outer circumference of the cam 41. The cam 41 includes a shaft section 411 that rotates around the axis "a" and a cam section 412 that projects to the outer side from one end portion of the shaft section 411.

For example, a shaft 61 functioning as an input shaft is coupled to the shaft section 411. The outer circumferential surface of the cam section 412 is formed in an elliptical shape or an oval shape when viewed from a direction along the axis "a". The bearing 42 includes a flexible inner ring 421 and a flexible outer ring 423 and a plurality of balls 422 disposed between the inner ring 421 and the outer ring 423. The inner ring 421 is fit in the outer circumferential surface of the cam section 412 of the cam 41 and is elastically deformed into an elliptical shape or an oval shape along the outer circumferential surface of the cam section 412. According to the elastic deformation of the inner ring 421, the outer ring 423 is also elastically deformed in an elliptical shape or an oval shape. The outer circumferential surface of the inner ring 421 and the inner circumferential surface of the outer ring 423 respectively have track surfaces for rolling the plurality of balls 422 while guiding the plurality of balls 422 along the circumferential direction. The plurality of balls 422 are held by a not-shown holder to keep intervals among the plurality of balls 422 in the circumferential direction constant. Not-shown grease is disposed in the bearing 42. The grease may be the same as or may be different from the lubricant G explained below.

In such a wave generator 4, the direction of the cam section 412 changes according to the rotation around the axis "a" of the cam 41. According to the change of the direction of the cam section 412, the outer circumferential surface of the outer ring 423 is deformed to move the meshing position of the rigid gear 2 and the flexible gear 3 in the circumferential direction.

The rigid gear 2, the flexible gear 3, and the wave generator 4 are respectively made of metal materials such as iron-based materials, for example, cast iron, nickel-chrome-molybdenum steel, chrome-molybdenum steel (SCM), maraging steel, and precipitation hardening stainless steel.

In particular, the flexible gear 3, which is the external gear, is preferably configured using nickel-chrome-molybdenum steel as a main material. The nickel-chrome-molybdenum steel is formed as tough steel by appropriate heat treatment and is excellent in mechanical characteristics such as fatigue strength. Therefore, the nickel-chrome-molybdenum steel is suitable as a constituent material of the flexible gear 3 on which stress is repeatedly acts.

Examples of the nickel-chrome-molybdenum steel include steel materials of types specified by JIS G 4053: 2016. Specifically, examples of the nickel-chrome-molybdenum steel include steel materials indicated by signs SNCM220, SNCM240, SNCM415, SNCM420, SNCM431, SNCM439, SNCM447, SNCM616, SNCM625, SNCM630, and SNCM815 specified in the JIS standard. Among these steel materials, as the nickel-chrome-molybdenum steel used as the constituent material of the flexible gear 3, it is preferable to use, in particular, SNCM439 from the viewpoint of excellent mechanical characteristics.

The constituent material of the flexible gear 3 may include materials other than the nickel-chrome-molybdenum steel. That is, the flexible gear 3 may be made of a composite material formed by combining the nickel-chrome-molybdenum steel and the other materials. However, it is preferable that a mass ratio of the nickel-chrome-molybdenum steel is larger than a mass ratio of the other material in the entire composite material, that is, the nickel-chrome-molybdenum steel is a main material.

On the other hand, the rigid gear 2, which is the internal gear, is preferably made of a material including graphite particles 21 and more preferably configured using, as a main material, spherical graphite cast iron including the graphite particles 21 and a matrix structure 22. The spherical graphite cast iron is called ductile cast iron as well and is, for example, as shown in FIG. 7, cast iron including the graphite particles 21 and the matrix structure 22 present around the graphite particles 21. In this embodiment, graphite cast iron, a roundness factor of the graphite particles 21 of which in an image analysis is within a range of 0.56 to 1.00 in a classification based on a roundness factor of the graphite particles 21 specified in the appendix B of JIS G 5505:2013, is referred to as "spherical graphite cast iron". That is, graphite cast iron including the graphite particles 21 having roundness of a fixed degree or more on an image is the spherical graphite cast iron. The image analysis means an analysis by an image analysis device that automatically or semiautomatically calculates a roundness factor. An area of a target region of the image analysis is 4 mm$^2$ or more.

In such spherical graphite cast iron, since the graphite particles 21 are formed in a spherical shape, the graphite particles 21 less easily become start points of cracks. Therefore, the spherical graphite cast iron can exert the strength of the matrix structure 22 to the maximum compared with, for example, flaky graphite cast iron. As a result, the spherical graphite cast iron is excellent in strength and toughness. Accordingly, it is possible to realize extension of the life of the rigid gear 2.

Since the graphite particles 21 included in the spherical graphite cast iron function as lubricant, the internal teeth 23 of the rigid gear 2 less easily adhere. Accordingly, it is possible to achieve a further reduction in wear of the rigid gear 2 and achieve extension of the life of the rigid gear 2.

In addition, the spherical graphite cast iron can convert vibration transmitted thereto into thermal energy in the boundaries between the graphite particles 21 and the matrix structure 22 and cause the vibration to disappear. Accordingly, it is possible to reduce vibration and noise that occur in the rigid gear 2.

Further, the spherical graphite cast iron has high thermal conductivity and is excellent in heat dissipation. Accordingly, the heat dissipation of the rigid gear 2 also increases. It is possible to suppress extremely high temperature of the rigid gear 2.

According to the effects explained above, it is possible to achieve extension of the life of the gear device 10.

The life of the gear device 10 means, for example, a time from a start of use of the gear device 10 until occurrence of damage in any part of the gear device 10. Examples of such damage include breakage of the rigid gear 2 or the flexible gear 3.

When an average particle diameter of the graphite particles 21 is represented as D [μm], the rigid gear 2 satisfies $10 \leq D \leq 40$ and preferably satisfies $12 \leq D \leq 30$. Such a rigid gear 2 includes relatively large graphite particles 21. Accordingly, the effects by the graphite particles 21 explained above are sufficiently exerted. It is possible to realize the rigid gear 2 that contributes to extension of the life of the gear device 10.

The particle diameter of the graphite particles 21 is calculated as follows. First, mirror polishing is applied to a cross section of the rigid gear 2. Subsequently, a polished surface is observed by a microscope and a range of 1.3 mm×1.8 mm is photographed. Image processing is applied to an obtained image and an area of images of the graphite particles 21 is calculated. The images are regarded as perfect circles and a diameter of the graphite particles 21 is calculated from the obtained area. The diameter calculated in this way is set as a particle diameter of the graphite particles 21. The average particle diameter D means a particle diameter at the time when a cumulative number of the graphite particles 21 photographed in the image counted from the graphite particle 21 having the smallest particle diameter is 50% of all the graphite particles 21.

Examples of the spherical graphite cast iron include materials of types specified in JIS G 5502:2001. Specifically, examples of the spherical graphite cast irons include materials indicated by signs FCD350-22, FCD350-22L, FCD400-18, FCD400-18L, FCD400-15, FCD400-10, FCD450-10, FCD500-7, FCD600-3, FCD700-2, FCD800-2, and FCD900.

Quenching and tempering treatment or austemper treatment may be applied to the spherical graphite cast iron according to necessity. Consequently, it is possible to increase mechanical strength of the spherical graphite cast iron and achieve further extension of the life of the gear device 10.

Examples of an alloy composition of the spherical graphite cast iron include a composition including Fe (iron) as a main component and including C (carbon) by 2.0 mass % or more and 6.0 mass % or less, including Si (silicon) by 0.5 mass % or more and 3.5 mass % or less, and including Mn (manganese) by 0.4 mass % or more and 1.0 mass % or less. Further, Cu (copper), Ni (nickel), Cr (chrome), Sn (tin), Mg (magnesium), and the like may be included in the spherical graphite cast iron.

The particle diameter of the graphite particles 21 can be controlled by manufacturing conditions for the rigid gear 2. For example, the particle diameter of the graphite particles 21 can be increased by reducing coagulation speed in casting the rigid gear 2. On the other hand, control opposite to this control can be performed by increasing the coagulation speed.

The particle diameter of the graphite particles 21 can be increased by increasing an amount of carbon added to the spherical graphite cast iron, reducing cooling speed when heat treatment is performed after the casting, or using a sand mold rather than a metal mold as a material of a casting mold. On the other hand, control opposite to this control can be performed by reducing the amount of carbon, reducing the cooling speed, or using the metal mold.

As shown in FIG. 7, the main material of the rigid gear 2 may include the matrix structure 22 besides the graphite particles 21.

The matrix structure 22 means a portion other than the graphite particles 21 in the main material of the rigid gear 2. The matrix structure 22 may be any structure and includes a pearlite structure or a mixed structure of the pearlite structure and a ferrite structure.

The pearlite structure means a mixed structure in which the ferrite structure and a layered cementite structure are alternately arranged. A lot of iron carbides are included in the cementite structure. "Layered" means a state in which an aspect ratio specified by a major axis/a minor axis of a crystal structure is, for example, 5 or more. On the other hand, the ferrite structure is a structure called a solid solution as well. Since such a pearlite structure is included in the matrix structure 22, it is possible to particularly increase fatigue strength of the spherical graphite cast iron.

The pearlite structure may be present independently or may coexist with the ferrite structure. A coexistence structure of the pearlite structure and the ferrite structure can achieve both of high strength and tenacity because mainly hardness is increase in the pearlite structure and mainly toughness is increased in the ferrite structure.

The matrix structure 22 may include, besides the structures described above, a martensite structure, an austenite structure, a sorbite structure, and a bentonite structure. In that case, an area ratio occupied by a total of areas of the pearlite structure and the ferrite structure in the entire matrix structure 22 is preferably 60% or more and more preferably 90% or more. Consequently, the effects described above are more surely exerted.

2.2. Case

The case 5 shown in FIG. 2 includes a substantially plate-like lid body 11 that supports the shaft 61 via a bearing 13 and a cup-like main body 12 that supports the shaft 62 via a bearing 14. The lid body 11 and the main body 12 are coupled to form a space. The gear device main body 1 explained above is housed in the space. The rigid gear 2 of the gear device main body 1 explained above is fixed to at least one of the lid body 11 and the main body 12 by, for example, screwing or the like.

An inner wall surface 111 of the lid body 11 is formed in a shape expanding in a direction perpendicular to the axis "a" to cover the opening section 36 of the flexible gear 3. An inner wall surface 121 of the main body 12 is formed in a shape conforming to the outer circumferential surface and the bottom surface of the flexible gear 3. Such a case 5 is fixed to the base 110 of the robot 100 explained above. The lid body 11 may be separate from the base 110 and fixed to the base 110 by screwing or the like or may be integral with the base 110. A constituent material of the case 5 including the lid body and the main body 12 is not particularly limited. Examples of the constituent material include a metal material and a ceramics material.

2.3. Lubricant

The lubricant G is, for example, grease, that is, semisolid lubricant and is disposed at least one of a part between the rigid gear 2 and the flexible gear 3, which is a meshing part, and a part between the flexible gear 3 and the wave generator 4, which is a contact part/a sliding part. In the following explanation, the meshing part and the contact part/the sliding part are referred to as "lubrication target parts". By supplying the lubricant G to such lubrication target parts, it is possible to reduce wear of the lubrication target parts.

The lubricant G includes, for example, base oil, a thickening agent, and an organic molybdenum compound.

Examples of the base oil include mineral oil such as paraffin-based oil and naphthene-based oil and synthetic oil such as polyolefin, ester, and silicone. One kind of these kinds of base oil can be independently used or a two or more kinds of these kinds of base oil can be used in combination. Examples of the thickening agent include soap-based thickening agents such as calcium soap, calcium complexed soap, sodium soap, aluminum soap, lithium soap, and lithium complexed soap and non-soap-based thickening agents such as polyurea, sodium terephthalate, polytetrafluoroethylene (PTFE), organic bentonite, and silica gel. One kinds of these thickening agents can be independently used or two or more kinds of these thickening agents can be used in combination. In this way, in the lubricant G including the base oil and the thickening agent as a composition, three-dimensional structures formed by the thickening agent are complicatedly entangled to hold the base oil. The held base oil is oozed little by little to exert lubrication action.

2.4. Convex Pattern of the Rigid Gear

As shown in FIG. 4, the rigid gear 2 is a ring-like gear including a large number of internal teeth 23. The internal teeth 23 include, as shown in FIG. 5, tooth surfaces 231 and tooth bottoms 232 and tooth tips 233 continuous to the tooth surfaces 231. As shown in FIGS. 6 and 7, at least the tooth surface 231 comes into contact with and rubs with a tooth surface 331 of the external tooth 33 of the flexible gear 3. Consequently, torque is transmitted between the rigid gear 2 and the flexible gear 3.

The tooth surface 231 of the internal tooth 23 includes, as shown in FIGS. 5 and 7, a plurality of convex parts 71 extending along an axial direction A (a first direction). The convex parts 71 extend substantially in parallel to one another and, in the tooth surface 231, arranged side by side in a direction (a second direction) having a component in a radial direction R. A convex pattern 7 shown in FIG. 5 is formed by such a plurality of convex parts 71.

The convex parts 71 may not be completely parallel to one another. The convex parts 71 may include parts where the convex parts 71 partially cross one another or branch from one another. Further, the first direction in which the convex parts 71 extend should be a direction having a direction component in the axial direction A. Therefore, the first direction in which the convex parts 71 extend is not limited to the direction parallel to the axial direction A shown in FIG. 5 and may be a direction tilted with respect to the axial direction A. Further, the second direction in which the plurality of convex parts 71 are arranged side by side is not particularly limited if the second direction is a direction crossing the extending direction of the convex parts 71. The convex parts 71 may include parts bent or broken halfway.

The convex parts 71 mean parts projecting more than the peripheries of the convex parts 71. In FIG. 5, the convex parts 71 linearly extending along the axial direction A are indicated by straight lines. Such convex parts 71 are called convex ridges as well. The plurality of convex parts 71 are arranged side by side at a predetermined interval. In FIG. 7, among the plurality of convex parts 71, two convex parts 71 adjacent to each other are represented as a first convex part 711 and a second convex part 712.

In this embodiment, a separation distance between the first convex part 711 and the second convex part 712 in the direction (the second direction) in which the convex parts 71 are arranged side by side is represented as S [μm]. The separation distance S is the distance between the distal end portion of the first convex part 711 and the distal end portion of the second convex part 712. As explained above, the main material of the rigid gear 2 is the material including the graphite particles 21. The average particle diameter of the main material is represented as D [μm]. In this case, the rigid gear 2 satisfies S−D≤20 in addition to 10≤D≤40 described above.

With such a configuration, as shown in FIG. 7, a probability that the graphite particles 21 are exposed to the tooth surface 231 of the internal tooth 23 of the rigid gear 2 increases. Since the difference between the separation distance S and the average particle diameter D is equal to or smaller than the upper limit value described above, the width of the convex parts 71 in the convex pattern 7 is relatively small compared with the particle diameter of the graphite particles 21. Then, a ratio of the graphite particles 21 particularly exposed to the tops of the convex parts 71 also increases. Since the tops of the convex parts 71 are parts where a probability of rubbing with the tooth surface 331 of the external tooth 33 of the flexible gear 3 is the highest, lubricity between the internal tooth 23 and the external tooth 33 can be increased when the graphite particles 21 are exposed to the tops of the convex parts 71. As a result, it is possible to achieve extension of the life of the gear device 10.

Figure 8:
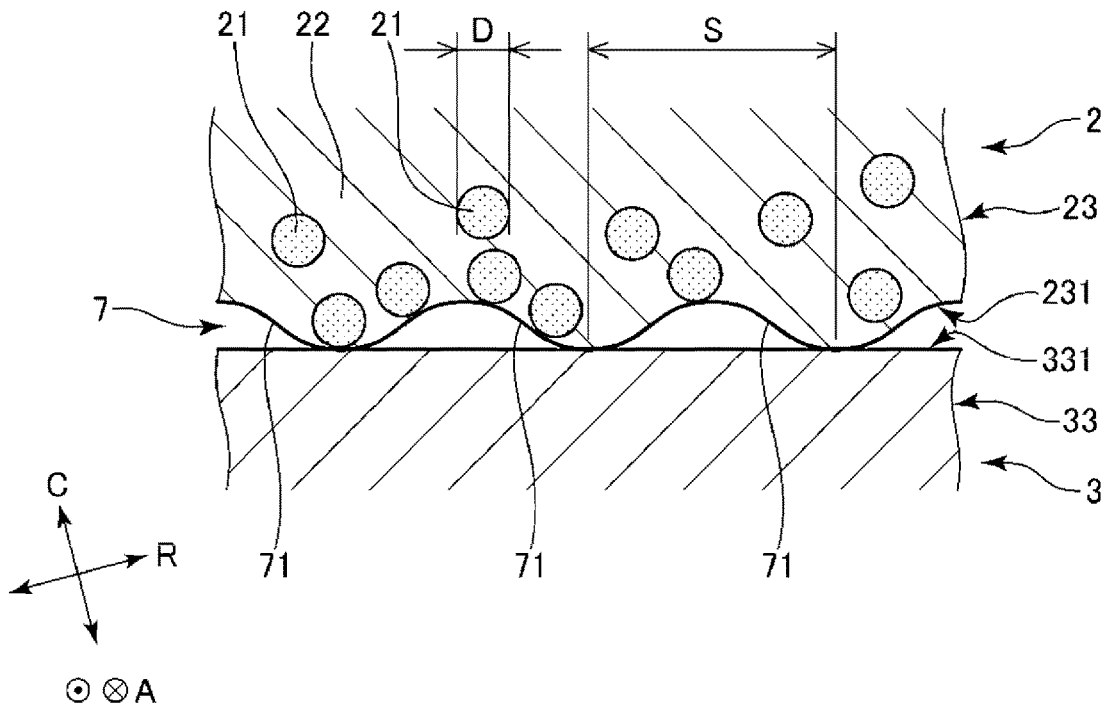
FIG. 8 is a diagram showing the same position as FIG. 7 in a gear device of related art.

FIG. 8 is a diagram showing the same position as FIG. 7 in a gear device of related art. For convenience of explanation, in FIG. 8, the same reference numerals and signs as the reference numerals and signs in FIG. 7 are affixed.

The gear device shown in FIG. 8 satisfies S−D>20. Specifically, the separation distance S shown in FIG. 8 is longer compared with the separation distance S shown in FIG. 7. Accordingly, the number of convex parts 71 provided in a unit area of the tooth surface 231 shown in FIG. 8 is smaller than the number of convex parts 71 on the tooth surface 231 shown in FIG. 7. Consequently, the ratio of the graphite particles 21 exposed to the tops of the convex parts 71 is also smaller. As a result, at the tops of the convex parts 71 shown in FIG. 8, compared with the convex parts 71 shown in FIG. 7, friction with the tooth surface 331 of the external tooth 33 of the flexible gear 3 increases.

As explained above, the gear device 10 includes the rigid gear 2, which is the internal gear, the flexible gear 3, which is the external gear, and the wave generator 4. The flexible gear 3 has flexibility and partially meshes with the rigid gear 2 and relatively rotates around the rotation axis (the axis "a") with respect to the rigid gear 2. The wave generator 4 is provided on the inner side of the flexible gear 3 and moves the meshing position of the rigid gear 2 and the flexible gear 3 in a circumferential direction C around the rotation axis.

The main material of the rigid gear 2 is the material including the graphite particles 21. Further, the tooth surface 231 of the internal tooth 23 of the rigid gear 2 includes the convex pattern 7 including the first convex part 711 and the second convex part 712. The first convex part 711 and the second convex part 712 extend in the axial direction A (the first direction having the component along the axis "a") and arranged side by side in the direction crossing the axial direction A (the second direction crossing the first direction). The rigid gear 2 satisfies $10 \leq D \leq 40$ and $S-D \leq 20$.

With such a configuration, it is possible to expose, at a high probability, the graphite particles 21 to a position where the graphite particles 21 rub with the external tooth 33 of the flexible gear 3 in the tooth surface 231 of the internal tooth 23 of the rigid gear 2. Consequently, the probability that the graphite particles 21 and the external tooth 33 come into contact increases. As the graphite particles 21 are gradually shaved, the lubricity between the internal tooth 23 and the external tooth 33 can be increased. As a result, it is possible to achieve extension of the life of the gear device 10.

Since parts among the convex parts 71 are concave parts, the lubricant G easily accumulates in the concave parts. Consequently, flowing out the lubricant G is suppressed. The lubricity can also be increased by the lubricant G.

At least a part of the tooth surface 231 should satisfy $10 \leq D \leq 40$ and $S-D \leq 20$. However, the tooth surface 231 preferably satisfies $10 \leq D \leq 40$ and $S-D \leq 20$ in a region of 30% or more, more preferably satisfies $10 \leq D \leq 40$ and $S-D \leq 20$ in a region of 50% or more, and still more preferably satisfies $10 \leq D \leq 40$ and $S-D \leq 20$ in a region of 65% or more of the entire area of the tooth surface 231. Consequently, the effects described above are more surely obtained.

The separation distance S is calculated by measuring, in a part of the first direction, the distance between the top of the first convex part 711 and the top of the second convex part 712 in the second direction. Alternatively, the distance between the top of the first convex part 711 and the top of the second convex part 712 in the second direction is measured at ten or more points distributed over the entire length in the first direction and arranged side by side at equal intervals. The separation distance S is calculated as an average of values of the measurement.

Figure 9:
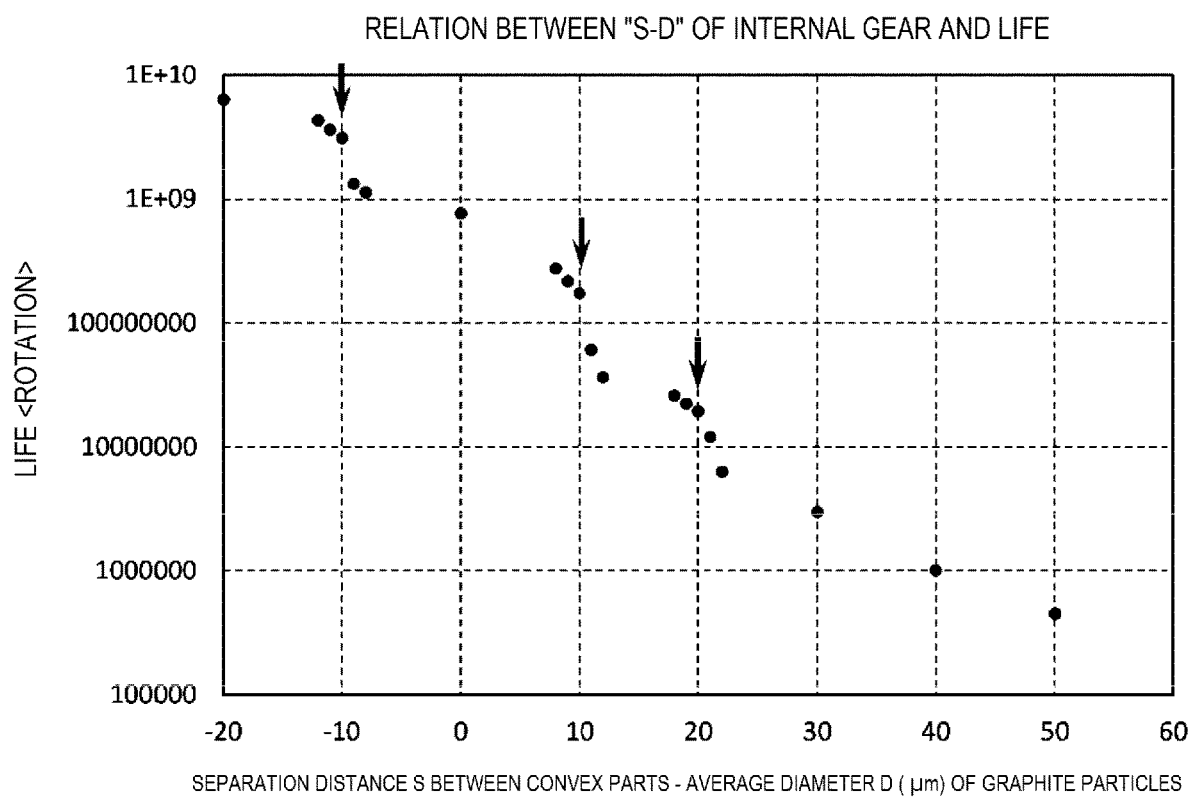
FIG. 9 is a graph showing a relation between S–D and life.

FIG. 9 is a graph showing a relation between S–D and the life. The horizontal axis of FIG. 9 indicates S–D and the vertical axis of FIG. 9 indicates the life of the gear device 10. FIG. 10 is a table showing evaluation for the graph of FIG. 9. In FIG. 10, the life shown in FIG. 9 is classified into four classes and evaluated. The classes of the evaluation are represented by signs A to D. The A evaluation is equivalent to the most satisfactory evaluation and the D evaluation is equivalent to the most unsatisfactory evaluation.

As shown in FIG. 9, in a range in which S–D is larger than 20 μm, the life of the gear device 10 tends to be longer when S–D is reduced. On the other hand, FIG. 9 shows that by setting S–D to 20 μm or less, the life of the gear device 10 suddenly becomes longer than extrapolation of a tendency to that point. Therefore, the element S–D is particularly significant from the viewpoint of achieving extension of the life of the gear device 10.

The rigid gear 2 preferably satisfies $S-D \leq 10$. FIG. 9 shows that the life of the gear device 10 suddenly becomes longer by setting S–D to 10 μm or less. Consequently, it is possible to achieve further extension of the life of the gear device 10.

Further, the rigid gear 2 preferably satisfies $S-D \leq -10$. FIG. 9 shows that the life of the gear device 10 suddenly becomes longer by setting S–D to −10 μm or less. Consequently, it is possible to achieve further extension of the life of the gear device 10.

A lower limit value of S–D may not be particularly set but is preferably −30 μm and more preferably −20 μm. Consequently, it is possible to suppress a deficiency due to an excessively large particle diameter of the graphite particles 21, for example, deterioration in mechanical strength of the rigid gear 2.

Evaluation based on the graph of FIG. 9 is shown in FIG. 10.

In a range in which S–D is larger than 20 μm, as shown in FIG. 10, the evaluation of the life is the D evaluation. In this range, the life of the gear device 10 tends to be short.

In a range in which S–D is larger than 10 μm and equal to or smaller than 20 μm, as shown in FIG. 10, the evaluation of the life is the C evaluation. In this range, the gear device 10 has the lower limit life.

In a range in which S–D is larger than −10 μm and equal to or smaller than 10 μm, as shown in FIG. 10, the evaluation of the life is the B evaluation. In this range, since the relative number of convex parts 71 with respect to the graphite particles 21 increases, the graphite particles 21 can be exposed to the tops of the convex parts 71 at a higher probability.

In a range in which S–D is equal to or smaller than −10 μm, as shown in FIG. 10, the evaluation of the life is A. In this range, the life of the gear device 10 is particularly long.

The life of the gear device 10 is calculated, for example, as follows.

First, torque is input to the input shaft of the gear device 10 at the number of revolutions of 3000 rpm, average load torque of 50 Nm, and peak torque of 60 Nm and continuous operation is performed. The number of revolutions of the input shaft until the gear device 10 is damaged is set as the life of the gear device 10.

Figure 11:
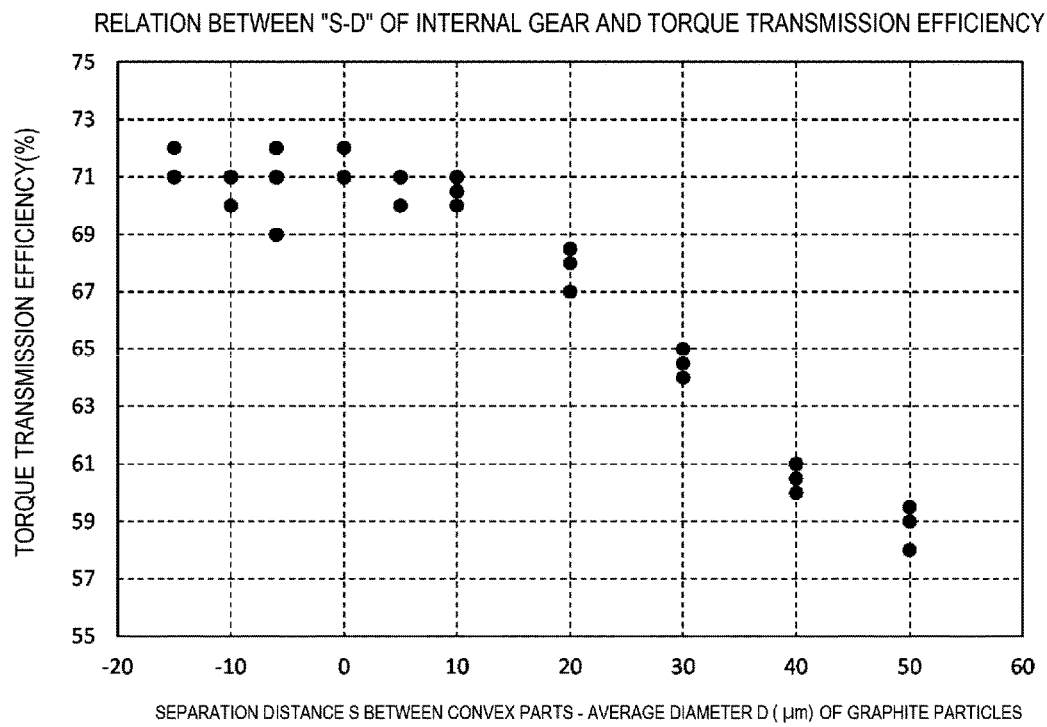
FIG. 11 is a graph showing a relation between S–D and torque transmission efficiency.
Figure 12:
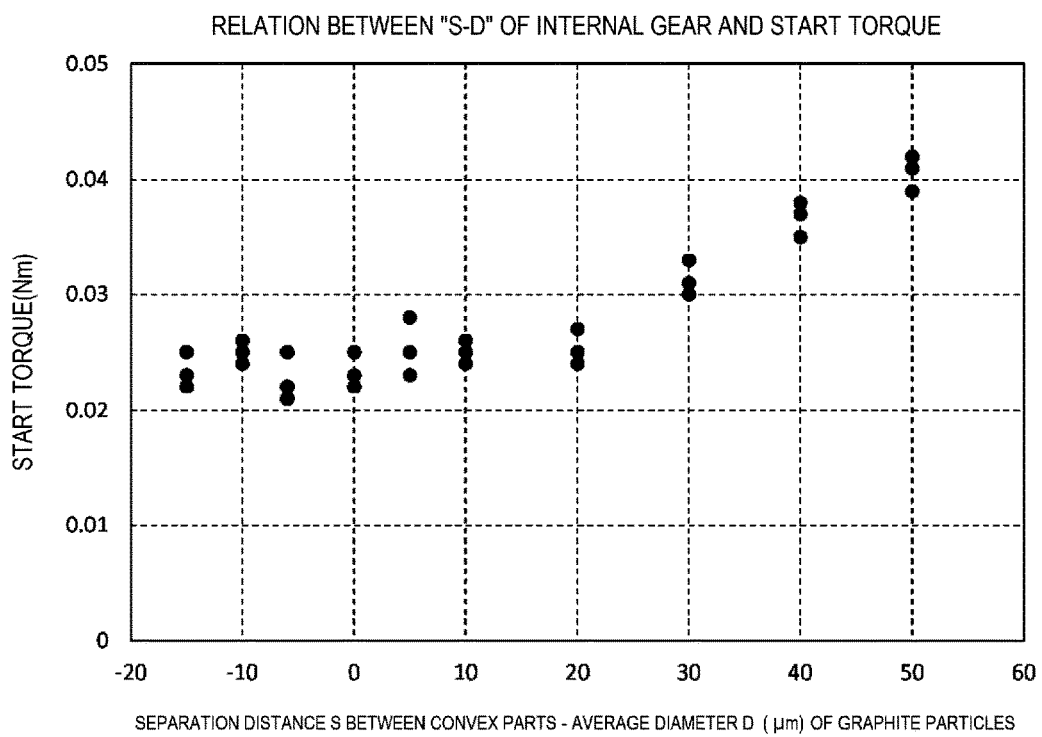
FIG. 12 is a graph showing a relation between S–D and start torque.

FIG. 11 is a graph showing a relation between S–D and torque transmission efficiency. FIG. 12 is a graph showing a relation between S–D and start torque. The horizontal axis of FIG. 11 and the horizontal axis of FIG. 12 respectively indicate S–D. The vertical axis of FIG. 11 and the vertical axis of FIG. 12 respectively indicate the life of the gear device 10.

As shown in FIG. 11, in a range in which S–D is larger than 20 μm, the torque transmission efficiency is as low as 65% or less. However, in a range in which S–D is equal to or smaller than 20 μm, sufficiently high torque transmission efficiency is obtained. In particular, in a range in which S–D is equal to or smaller than 10 μm, satisfactory torque transmission efficiency as high as 60% or more is obtained.

As shown in FIG. 12, in the range in which S–D is larger than 20 μm, the start torque is as high as 0.03 Nm or more.

However, in the range in which S−D is equal to or smaller than 20 μm, the start torque may be sufficiently small.

The torque transmission efficiency is a ratio of torque output from the output shaft of the gear device 10 to torque input to the input shaft of the gear device 10 at the number of revolutions of 2000 rpm. The start torque is torque required for the stopped input shaft to move 1°.

Such a convex pattern 7 may be formed by any method. Examples of a method of forming the convex pattern 7 include machining such as cutting and grinding, rolling such as knurling, polishing such as sand blast and shot blast, and molding such as casting. With the machining, it is possible to form the convex pattern 7 having high accuracy.

Projection height h of the convex parts 71 is not particularly limited. However, the projection height h is preferably equal to or larger than 0.01 μm and equal to or smaller than 30 μm and more preferably equal to or larger than 0.10 μm and equal to or smaller than 10 μm. Consequently, it is possible to optimize a contact area of the internal tooth 23 and the external tooth 33. As a result, it is possible to, while increasing lubricity between the rigid gear 2 and the flexible gear 3, suppress the occurrence of deformation such as a marked defect in the convex parts 71 and a large change in a torque transmission characteristic. The projection height h of the convex parts 71 means the distance between the top and the bottom of the convex part 71 as shown in FIG. 7.

On the other hand, the tooth surface 331 of the external tooth 33 meshing with the internal tooth 23 is not particularly limited and may be a flat surface as shown in FIG. 7 or may include a convex pattern including a plurality of convex parts, a concave pattern including a plurality of concave parts, or a concave-convex pattern including both of a plurality of convex parts and a plurality of concave parts.

The robot 100 according to this embodiment includes the base 110, which is the first member, the first arm 120, which is the second member that turns with respect to the base 110, the gear device 10 that transmits driving force for relatively turning the first arm 120 with respect to the base 110, and the motor 170, which is the driving source that outputs driving force toward the gear device 10.

With such a configuration, since extension of the life is achieved in the gear device 10, it is possible to realize the robot 100 that does not require time for maintenance and has satisfactory handleability.

3. Gear Device According to a Second Embodiment

A gear device according to a second embodiment is explained.

Figure 13:
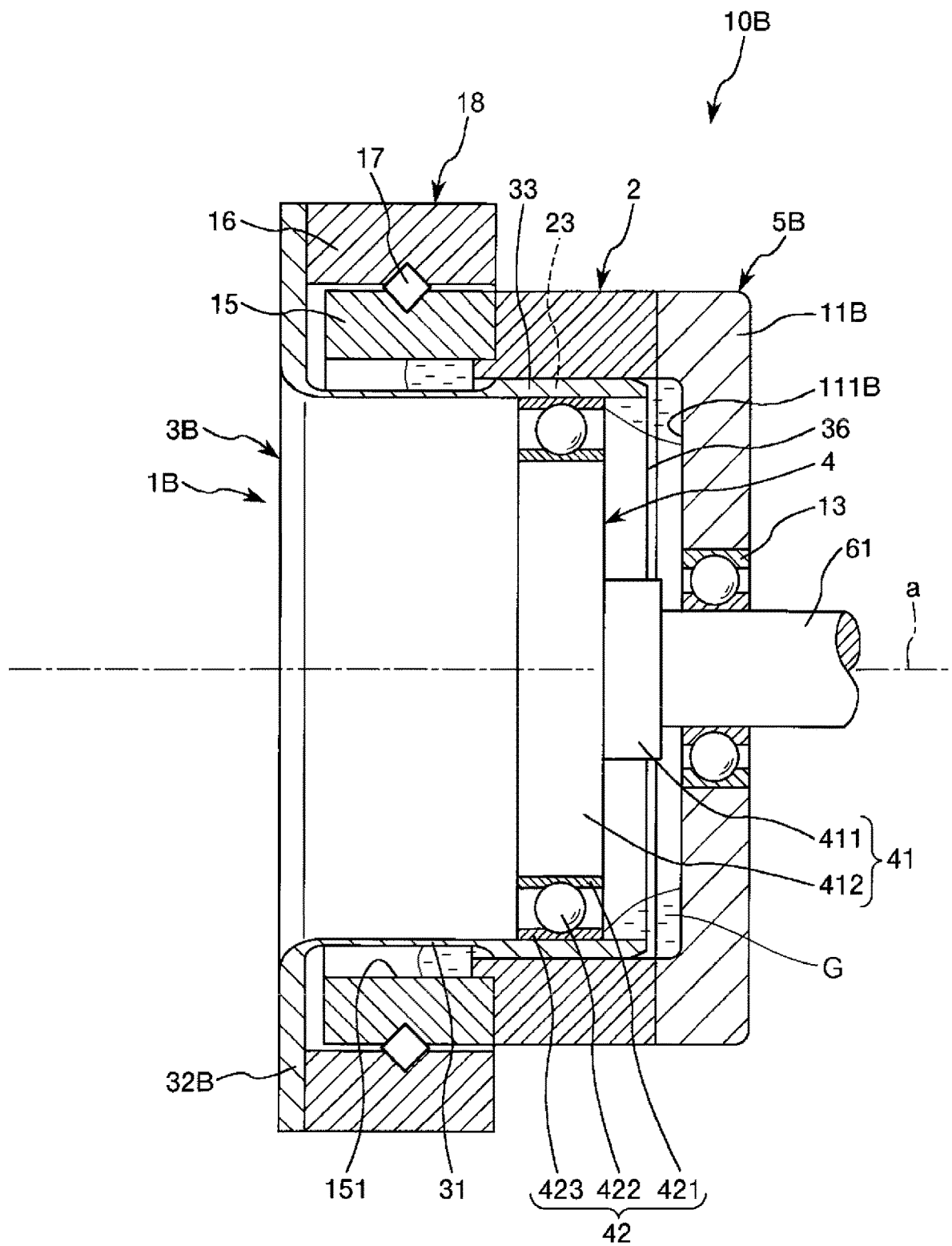
FIG. 13 is a longitudinal sectional view showing a gear device according to a second embodiment.

FIG. 13 is a longitudinal sectional view showing the gear device according to the second embodiment.

This embodiment is the same as the first embodiment explained above except that the configuration of an external gear and the configuration of a case involved in the configuration of the external gear are different. In the following explanation, concerning this embodiment, differences from the first embodiment are mainly explained. Explanation concerning similarities to the first embodiment is omitted. In FIG. 13, the same components as the components in the first embodiment are denoted by the same reference numerals and signs.

A gear device 10B shown in FIG. 13 includes a gear device main body 1B and a case 5B in which the gear device main body 1B is housed. The case 5B may be omitted.

The gear device 10B includes a flexible gear 3B, which is an external gear of a hat type disposed on the inner side of the rigid gear 2. The flexible gear 3B includes a flange section 32B coupled to one end portion of the tubular body section 31 and projecting to the opposite side of the axis "a".

A not-shown output shaft is attached to the flange section 32B. A constituent material and the like of the flexible gear 3B are the same as the constituent material and the like of the flexible gear 3 in the first embodiment.

The case 5B includes a substantially plate-like lid body 11B that supports, for example, the shaft 61 functioning as the input shaft via the bearing 13 and a cross roller bearing 18 attached to the flange section 32B of the flexible gear 3B explained above.

The lid body 11B is fixed to one side surface, that is, a side surface on the right side in FIG. 13 of the rigid gear 2 by screwing or the like. The cross roller bearing 18 includes an inner ring 15, an outer ring 16, and a plurality of rollers 17 disposed between the inner ring 15 and the outer ring 16. The inner ring 15 is provided along the outer circumference of the body section 31 of the flexible gear 3 and fixed to the other side surface, that is, the side surface on the left side in FIG. 13 of the rigid gear 2 by screwing or the like. The outer ring 16 is fixed to the flange section 32B of the flexible gear 3B by screwing or the like.

An inner wall surface 111B of the lid body 11B is formed in a shape expanding in a direction perpendicular to the axis "a" to cover the opening section 36 of the flexible gear 3B. An inner wall surface 151 of the inner ring 15 of the cross roller bearing 18 is formed in a shape conforming to the outer circumferential surface of the body section 31 of the flexible gear 3B.

In the second embodiment explained above, the same effects as the effects in the first embodiment are obtained.

The gear device and the robot according to the present disclosure are explained above based on the embodiments shown in the figures. However, the present disclosure is not limited to this. The components of the sections in the embodiments can be substituted with any components having the same functions. Any other components may be added to the embodiment.

In the embodiments explained above, the gear device that, when the base included in the robot is the "first member" and the first arm is the "second member", transmits driving force from the first member to the second member is explained. However, the present disclosure is not limited to this. The present disclosure is also applicable to a gear device that, when an n-th arm is the "first member" and a (n+1)-th arm is the "second member", transmits driving force from one of the n-th arm and the (n+1)-th arm to the other. Here, n is an integer equal to or larger than 1. The present disclosure is also applicable to a gear device that transmits driving force from the second member to the first member.

In the embodiments, a horizontal articulated robot is explained. However, the robot according to the present disclosure is not limited to this. For example, the number of joints of the robot is optional. The present disclosure is also applicable to a vertical articulated robot.

In the embodiments, an example is explained in which the gear device is incorporated in the robot. However, the gear device according to the present disclosure can be used by being incorporated in various devices having a configuration for transmitting driving force from one side to the other side of a first member and a second member that turn with respect to each other.

What is claimed is:
1. A gear device comprising:
an internal gear;
an external gear having flexibility configured to partially mesh with the internal gear and relatively rotate around a rotation axis with respect to the internal gear; and a wave generator provided on an inner side of the external gear and configured to move a meshing position of the internal gear and the external gear in a circumferential direction around the rotation axis, wherein a main material of the internal gear includes graphite particles, a tooth surface of an internal tooth of the internal gear has a convex pattern including a first convex part and a second convex part extending in a first direction having a component along the rotation axis and arranged side by side in a second direction crossing the first direction, and $10 \leq D \leq 40$ and $S-D \leq 20$, wherein $D$ [μm] is an average particle diameter of the graphite particles and $S$ [μm] is a separation distance between the first convex part and the second convex part in the second direction.

2. The gear device according to claim 1, wherein the internal gear satisfies $S-D \leq 10$.

3. The gear device according to claim 2, wherein the internal gear satisfies $S-D \leq -10$.

4. The gear device according to claim 1, wherein a main material of the external gear is nickel-chrome-molybdenum steel.

5. A robot comprising:
a first member;
a second member configured to turn with respect to the first member;
the gear device according to claim 1 configured to transmit driving force for relatively turning the second member with respect to the first member; and
a driving source configured to output the driving force toward the gear device.

* * * * *